(12) United States Patent
Poland et al.

(10) Patent No.: US 6,537,219 B2
(45) Date of Patent: Mar. 25, 2003

(54) STATIC FOCUS ULTRASOUND APPARATUS AND METHOD

(75) Inventors: Mckee D Poland, Andover, MA (US); Bernard J Savord, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/825,720

(22) Filed: Apr. 4, 2001

(65) Prior Publication Data

US 2002/0145941 A1 Oct. 10, 2002

(51) Int. Cl.⁷ .................................................. A61B 8/00
(52) U.S. Cl. ....................................................... 600/447
(58) Field of Search ................................ 600/437, 443, 600/447; 73/625–626; 128/916

(56) References Cited

U.S. PATENT DOCUMENTS

| | | | | |
|---|---|---|---|---|
| 4,271,706 A | * | 6/1981 | Ledley | 73/614 |
| 4,596,145 A | * | 6/1986 | Smith et al. | 73/626 |
| 4,694,434 A | * | 9/1987 | von Ramm et al. | 367/7 |
| 4,884,246 A | * | 11/1989 | Heyser et al. | 367/7 |
| 5,535,751 A | * | 7/1996 | Raz | 128/916 |
| 5,546,807 A | * | 8/1996 | Oxaal et al. | 73/606 |
| 5,690,114 A | * | 11/1997 | Chiang | 600/447 |
| 5,840,033 A | * | 11/1998 | Takeuchi | 600/443 |
| 5,997,479 A | * | 12/1999 | Savord et al. | 600/447 |
| 6,262,749 B1 | * | 7/2001 | Finger et al. | 345/521 |
| 6,276,211 B1 | * | 8/2001 | Smith | 73/626 |

\* cited by examiner

Primary Examiner—Francis J. Jaworski
(74) Attorney, Agent, or Firm—John Vodopia

(57) ABSTRACT

An ultrasound system that utilized a transducer assembly having elements distributed in two dimensions in conjunction with a beamformer that, for each beam to be formed, samples the output of each utilized element based on a preset delay value selected for each element utilized to form the beam to form a c-scan like set of data.

32 Claims, 6 Drawing Sheets

STATIC FOCUS ULTRASOUND APPARATUS AND METHOD

BACKGROUND OF THE INVENTION

Ultrasound transducer assemblies emit ultrasound pulses and receive echoes. In general an ultrasound assembly emits pulses through a plurality of paths and uses the received echoes from the plurality of paths to generate a cross-sectional or volumetric image. Such operation is typically termed "scanning", "sweeping", or "steering" a beam. In most ultrasound systems, scanning is rapidly repeated so that many images ("frames") are acquired within a second of time.

Real-time sonography refers to the presentation of ultrasound images in a rapid sequential format as the scanning is being performed. Scanning is either performed mechanically (by physically oscillating one or more transducer elements) or electronically. By far, the most common type of scanning in modern ultrasound systems is electronic wherein a group of transducer elements (termed an "array") are arranged in a line and excited by a set of electrical pulses, one pulse per element, timed to construct a sweeping action.

In a linear sequenced array, an aperture is swept across the array by exciting sequential (and overlapping) sub-groups of transducer elements. In a linear phased array, all (or almost all) the elements are excited by a single pulse, but with small (typically less than 1 microsecond) time difference ("phasing") between adjacent elements, so that the resulting sound pulses pile up along a specific direction (termed "steering"). In addition to steering the beam, the phased array can focus the beam, along the depth direction, by putting curvature in the phase delay pattern. More curvature places the focus closer to the transducer array, while less curvature moves the focus deeper. Delay can also be used with a linear sequenced array to provide focusing.

When an array is receiving echoes, the electric outputs of the elements can be delayed so that the array is sensitive in a particular direction, with a listening focus at a particular depth. This reception focus depth may be increased continually as the transmitted pulses travel through the tissue of the subject being imaged, focusing along the entire depth of the beam. This continual changing reception focus is called dynamic focusing. The combination of transmission focus and dynamic reception focusing greatly improves detail resolution over large depth ranges in images.

The apparatus that creates the various delays is called a beamformer. Known beamformers have traditionally operated in the analog domain employing expensive beamforming circuits capable of delivering a new point of data (dynamically delayed) every nano-second. More recently, digital beamformers, that provide delay by varying read times out of a digital memory, have been developed. While digital beamformers require extensive memory, exact clock devices and large timing tables, these components are cheaper and smaller than their analog counterparts. Such digital beamformers hold out the hope of cost effective portable ultrasound devices nearly as powerful as their stationary brethren.

Known portable ultrasound devices use a 1-D transducer assembly (known available devices use linear sequenced arrays) in the probe to produce an image taken on a plane that extends from the face of the probe. Currently, there are two classes of portable ultrasound devices: ultrasound specific devices and PC add-on devices.

Ultrasound specific devices are simply miniaturized ultrasound devices, typically with digital beamformers, that replicate larger stand alone units. One example of such a device is the SONOSITE device marketed by SONOSITE, INC. Unlike laptop computers, much of the circuitry and software in large top-of-the-line ultrasound systems is not suitable for miniaturization. Larger traditional components, such as beamformers, lose functionality when miniaturized. PC add-on devices attempt to integrate a transducer assembly and a beamformer in a probe housing. The probe is then connected to a PC, typically a well equipped laptop, to perform image creation from the beamformed data. One example of such a device is the TERASON 2000 by TERASON.

Another area of ultrasound technology receiving significant attention are probes having a transducer assembly comprising a matrix of elements (for example a 56×56 array of 3,136 elements), sometimes referred to a 2-D or matrix probe. Because matrix probes allow beam steering in 2 dimensions as well as the aforementioned focus in the depth direction, current efforts are related to using matrix transducer assemblies for the capture of a volume of ultrasound data to be used to render 3-D images. Unfortunately, the commercialization of large real-time full bandwidth 3-D images is probably a couple of years off due to lack of affordable image processing resources capable of acting on the volume of data produced by matrix transducers in real-time. To date no known available portable ultrasound devices utilize a matric transducer assembly, probably due to the expense involved with the implementation of a traditional dynamic focusing beamformers multiplied by the number of elements in a matrix probe that must be sampled.

Ultrasound imaging has always involved a tradeoff between image quality and the image processing resources required to process the data from the transducer to obtain the results desired by the user. While the rate at which data can be acquired is limited by physics (sound only travels so fast in the human body), the types of image processing that can be performed on the data is limited by the amount and quality of image processing resources that can be brought to bear upon the data. If real time imaging is desired, as it usually is, another limiting factor is the rate of data acquisition of the processing system.

Ultrasound data is typically acquired in frames, each frame representing a sweep of ultrasound beams emanating from the face of a transducer. 1-D transducers produce a 2-D rectangular or pie-shaped sweep. 2-D transducers are capable of producing sweeps forming a pre-defined 3-D shape, or volume. It is estimated that to fully process a relatively large volume (60°×60°) of ultrasound data in real time, a beamformer capable with 16×parallelism is required. Such a beamformer would be prohibitively expensive, especially in a market where the acceptable cost of ultrasound systems is rapidly decreasing. Current efforts are focused on ways to short cut full processing while bringing to market a 3-D ultrasound system capable of producing acceptable images at a price point competitive with current 2-D systems. No known portable 3-D solutions are currently available.

FIG. 1 is a block diagram of a known 3-D ultrasound imaging system 100 described in co-pending U.S. patent application Ser. No. 09/633,480 assigned to the assignee of the present application. The apparatus described in the Ser. No. 09/633,480 application uses interleaving to render a 3-D image with the appearance of a real-time image from data produced by a matrix transducer assembly. This allows the use of relatively standard components to minimize cost while providing a state of the art display. The system shown in FIG. 1 is, at the present time, is not available in a portable package.

The ultrasound system 100 utilizes a standard personal computer ("PC") 102, to act as a 3-D image processor and preferably produces an image using interpolated data. The ultrasound system 100 has a matrix transducer assembly 104 and utilizes the concept of sub-group beamforming. In the Example shown in FIG. 1, only elements 106*a* through 106*f* are illustrated, but those of ordinary skill in the art will recognize that any number of elements can be utilized. The transducer 104 is preferably configured for sub-group beamforming using a series of ASICs 108*n*. The use of sub-groups in beamforming is described in U.S. Pat. Nos. 5,997,479 and 6,126,602, both assigned to the assignee of the present application, the subject matter of each being incorporated herein by reference.

Two ASICs 108*a* and 108*b* are illustrated, corresponding to elements 106*a–f*. In the example shown each ASIC 108*n* is connected to three (3) elements although other designs are possible, for example, 5, 15, or 25 elements could be connected to each ASIC 108*n*. Each ASIC 108*n* is provided with a plurality of delay circuits 110*n* (one for each element connected to the ASIC 108*n*) that delay the output of a connected element 106*n* by a programable amount in a known manner so as to focus and steer acoustic beams. A sum circuit 112*n* combines the output of the delay circuits 110*n* in each ASIC 108*n*.

The output of each ASIC 108*n* is provided to a scanner 114, preferably located in a main housing of the ultrasound system 100, to complete beamforming. The output of each sum circuit 112*n* from each ASIC 108*n* is first A/D converted by a corresponding A/D converter 116*n*. The converted output of each sum circuit 112*n* is then delayed by a corresponding delay circuit 118*n* and subsequently summed with other delayed converted outputs by a sum circuit 120. Circuitry to perform image detection (not shown) is provided, perhaps as part of the sum circuit 120 to produce echo data by performing an image detecting procedure on the summed signal. A scanner control circuit 124 controls the timing and operation of the scanner 114 and transducer 104 using delay coefficients stored in a memory 122. In the case of the system shown in FIG. 1, the delay in each of the delay circuits 110*n* is kept static throughout reception of a single beam, but the delay in the delay circuits 118*n* are dynamically varied during reception to achieve dynamic focusing.

The output of the scanner 114 is sent to a back-end 126, provided in the main housing, via an I/O 128 for subsequent signal processing. The back-end 126 performs 2-D signal processing, while the PC 102 performs 3-D image processing. The back-end 126 is provided with a scan converter 130 which converts the 2-D scan data into X-Y space. Subsequent to scan conversion, an image processing unit 131 is provided that can be configured to perform a variety of 2-D image enhancement processes, such as color flow, Doppler, ect . . . , to create image data for display on a monitor 140.

A channel link transmitter 132 transfers the echo data received by the back-end 126 to the PC 102 which receives the echo data via a channel link receiver 134. The channel link can be formed using chip pairs, available from a variety of manufacturers, that conform to the Low Voltage Differential Signaling standard. As shown, the data transferred to the PC 102 is obtained from a data bus in the back end 126 prior to scan-conversion.

A CPU 136 performs computational tasks, including 3-D scan conversion (into X-Y-Z space) under the control of programs stored in memory 138. The CPU 136 creates display data which forms the basis for subsequent output to a monitor 140 (via, for example, an AGP video card (not shown)). The PC 102 performs 3-D rendering and 3-D data manipulation, with the assistance of an expansion card, such as the VOLUMEPRO series of cards supplied by MITSUBISHI. 3-D rendering, as is known to those of ordinary skill in the art, turns 3-D data into data suitable for display on a 2-D screen. The first step in the rendering process is to identify a plane to be imaged along with a point of view. The data set is then sliced and rendered from the selected point of view. Sometimes, the plane is volume rendered, that is enhanced with data from parallel planes "behind" the selected plane. Overall, the differences between images produced by a 3-D system (termed hereinafter "3-D images") and those produced by a conventional 2-D system are: a) a 3-D image may have an arbitrary orientation with respect to the face of the probe; and b) a 3-D image can be volume rendered to include image data from nearby slices giving the illusion of depth.

The apparatus illustrated in FIG. 1 is fairly representative of current 3-D ultrasound systems in that a significant amount of processing resources and complex signal processing devices are required to produce a rendered image. In the end though, what is often produced is still essentially a two dimensional image. One of the main concerns for designers of 3-D ultrasound systems is how to produce an image for display from the volume of data. As above, most methods revolve around identifying a plane of interest and displaying data from that plane and possibly slightly behind the plane.

The present inventors have recognized that, in effect, one of the significant contributions of a matrix probe is the ability to image an arbitrary plane within a volume of data. From this, they have discovered apparatus and methods for using a matrix probe to directly image an arbitrary geometry within the field of view of the probe. This allows the presentation of a 2-D image substantially similar to one produced by a conventional 3-D ultrasound system without the need for a significant amount of processing resources or complex signal processing devices. The present inventors have further discovered apparatus and methods for creating a portable ultrasound device that utilizes a matrix probe.

BRIEF DESCRIPTION OF THE DRAWINGS

An understanding of the present invention can be gained from the following detailed description of the invention, taken in conjunction with the accompanying drawings of which.

DESCRIPTION OF THE PREFERRED EMBODIMENTS

Figure 1:
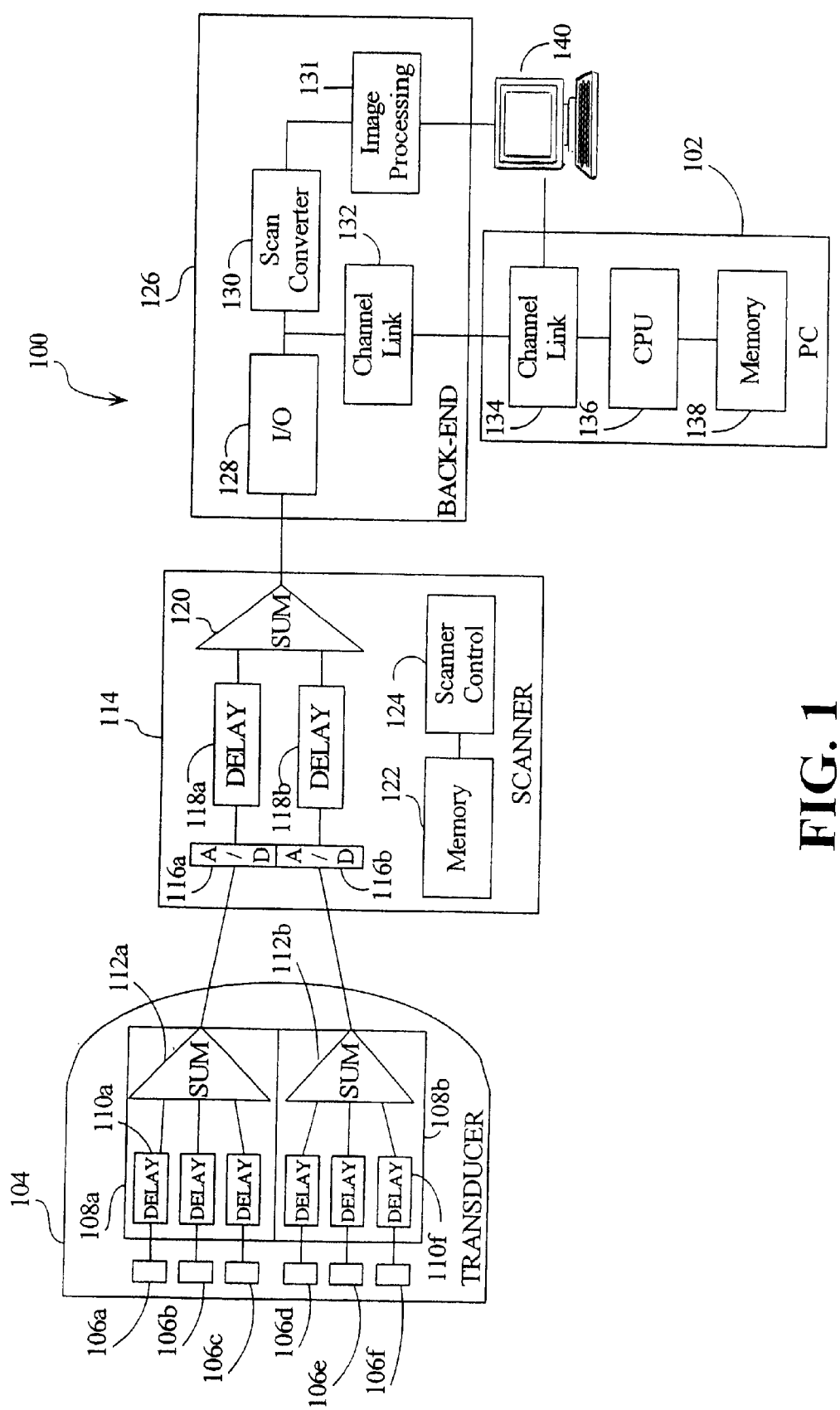
FIG. 1 is a block diagram of a known ultrasound imaging system.

Reference will now be made in detail to the present preferred embodiments of the present invention, examples of which are illustrated in the accompanying drawings, wherein like reference numerals refer to like elements throughout.

The present inventors have discovered that, contrary to conventional wisdom, by foregoing dynamic focusing and using a matrix probe an acceptable 2-D C-scan-like image can be produced with minimal hardware and processing resources. The present inventors have invented a new imaging method that takes advantage of a matrix transducer assembly to produce excellent quality 2-D images that have several advantages over 2-D images produced by convention 1-D probes. Significantly, apparatus constructed to take advantage of this method avoids the use of costly state-of-the-art beamformers, making it suitable for portable systems. Such a system may also be used to present an acceptable 3-D image by obtaining a slab of data.

The apparatus set forth in the present application is preferably specifically constructed for the required purpose, i.e. ultrasound imaging, but the methods recited herein may operate on a general purpose computer or other network device selectively activated or reconfigured by a routine stored in the computer and interface with the described ultrasound imaging equipment. The procedures presented herein are not inherently related to any particular ultrasonic system, computer or other apparatus. In particular, various machines may be used with routines in accordance with the teachings herein, or it may prove more convenient to construct more specialized apparatus to perform the required method steps. In certain circumstances, when it is desirable that a piece of hardware possess certain characteristics, these characteristics are described more fully in the following text. The required structures for a variety of such hardware may appear in the description given below. Machines which may perform the functions of the present invention include those manufactured by such companies as AGILENT TECHNOLOGIES, and ADVANCED TECHNOLOGY LABORATORIES, INC., as well as other manufacturers of ultrasound equipment.

With respect to the methods described herein, those of ordinary skill in the art will recognize that there exists a variety of platforms and languages for creating software for performing such methods. Those of ordinary skill in the art also recognize that the choice of the exact platform and language is often dictated by the specifics of the actual system constructed, such that what may work for one type of system may not be efficient on another system.

Figure 2:
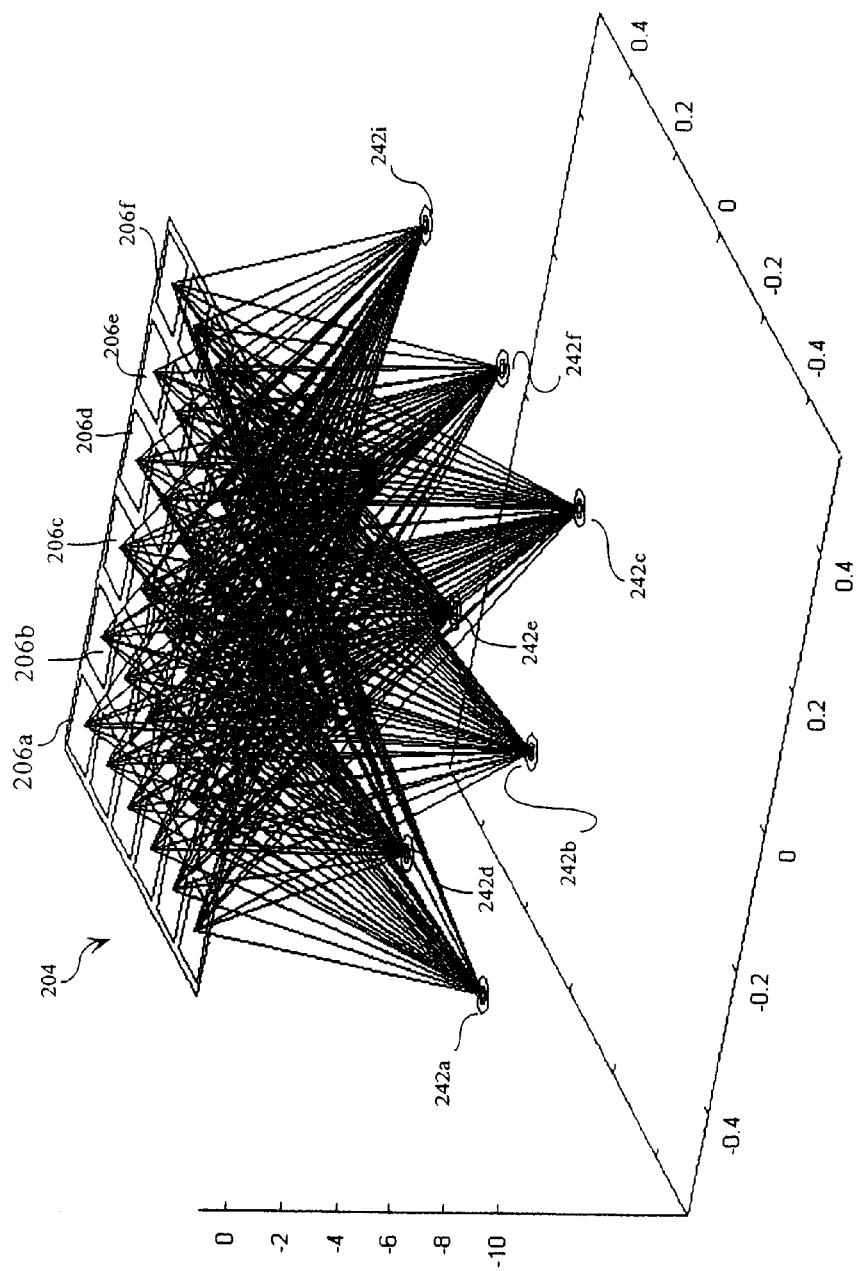
FIG. 2 is a drawing illustrating a method of using an ultrasound imaging system in accordance with preferred embodiments of the present invention.

FIG. 2 is a drawing illustrating a method of using an ultrasound imaging system in accordance with preferred embodiments of the present invention. FIG. 2 shows a 6×6 matrix transducer assembly 204 with representative beams (also referred to as "scan lines") formed in accordance with the present invention. Each scan line is formed by a set of individual acoustic path lines from each element 206n (only elements 206a through 206f are labeled for ease of explanation) terminating at a particular focus points 242a through 242i.

Those of ordinary skill in the art will realize that FIG. 2 is just a conceptual representation of the operation of the transducer assembly 204 in that the signal from and to each element does not perfectly travel along the lines shown therein, rather the lines and focal points are representations of the effect of the signals output by each elements 206n based on the delays imparted to the drive signal for each element 206n. In general, each focal point 242n represents the data obtained from a single scan line, or "beam," while the collection of focal points 242a–242i represents a single frame.

Only focal points 242a–242i are portrayed so as to keep the illustration understandable. However, those of ordinary skill in the art will recognize that the number of scan lines per frame is a design choice based on a trade-off between resolution and frame rate. Preferably, more lines per frame are generated than in a corresponding 1-D probe equipped system. In general, the number of scan lines per frame should be selected using the same criteria for such selection in a conventional 3-D imaging system.

In accordance with a preferred embodiment of the present invention, the receive delays for each scan line, in the set of scan lines (for example, a frame), are set to be equal to the time of flight to and from the focal point along the respective lines from each element. The delays for each of the elements 206n scan line are said to be static. In other words, while the receive delays for each element may vary as between different beams, for any given beam they are constant for the entire receive process of that beam. While preferable, the receive delay for each element does not necessarily have to coincide with the time of flight to and from the transmit focus, as described herein below.

Each of the focal points 242n lie on a predetermined arbitrary geometric shape, for example a planar surface, a curved surface, or other shapes such as frusto-conical (referred to as an "arbitrary geometry"). In a sense, the continuous receive focus achieved by 1-D probes over a plane extending from the probe face is replaced through the use of a matrix probe and static focus. Instead of focusing at multiple receive points on a plane extending from the probe, the present invention focuses at a single point per scan line wherein the focus points lie on an arbitrary geometry, in effect giving dynamic focus over the surface of the imaged shape. Preferably the focus points are co-planner, although those of ordinary skill in the art will recognize that other shapes, such as concave or convex curves, may be useful depending on the subject being imaged.

The scan lines may occupy a pyramidal or frustum shape, or may be parallel (for a "linear" format). If a parallel shape is utilized, the scan view will be the same size as the probe aperture. If a frustum shape is used the scan view may be larger than the probe aperture, however, depending on the focus depth, more scan lines may be needed to achieve a similar resolution to that obtained with the parallel shape.

When used to image an arbitrary plane, the scan produced in accordance with the present invention is similar to a type of scan called a "c-scan." In general, the term "c-scan" refers to a scan of any plane that does not intersect the transducer. The present invention produces a scan similar to a c-scan, in that it does not necessarily intersect the transducer (although with proper selection of delays the imaging plane may intersect the probe face). As noted, the present invention is not limited to a plane, but can image any arbitrary geometry. Further, in accordance with the present invention, and differing from the traditional notion of a c-scan, the c-scan produced by the present invention may have thickness. The data produced by a scan in accordance with the present invention can represent as much thickness as can be imaged by the overlap of transmit and receive beams. Thus, the data set produced by the present invention may represent a "slab" having a thickness roughly equal to or less than the depth of field of the scan lines. The static transmit and receive foci may be displaced from one another by a short distance to increase the composite beam's effective depth of field, thereby increasing the depth of the slab.

In displaying the resulting slab of data at least two techniques can be employed. First, it can be treated as a matrix of data, sliced and rendered as with a full volume matrix. In other words, the slab can be rendered into a 3-D image using known methods, including the 2-D display of a slice of the slab. Controls can be provided on the ultrasound system to allow the user to adjust the thickness of the slab and/or the depth of the slice imaged. Second, the data in the slab can be accumulated (or averaged) over the depth of each beam.

In summary, in exchange for preselecting the plane to be viewed, acceptable 3-D images can be produced with a limited data set which, as described herein below, may be obtained with a highly simplified beamformer. One way to think of the present invention is that instead of obtaining data from an entire volume and slicing to get a view, the present invention gets data directly from the sliced surface.

Figure 3:
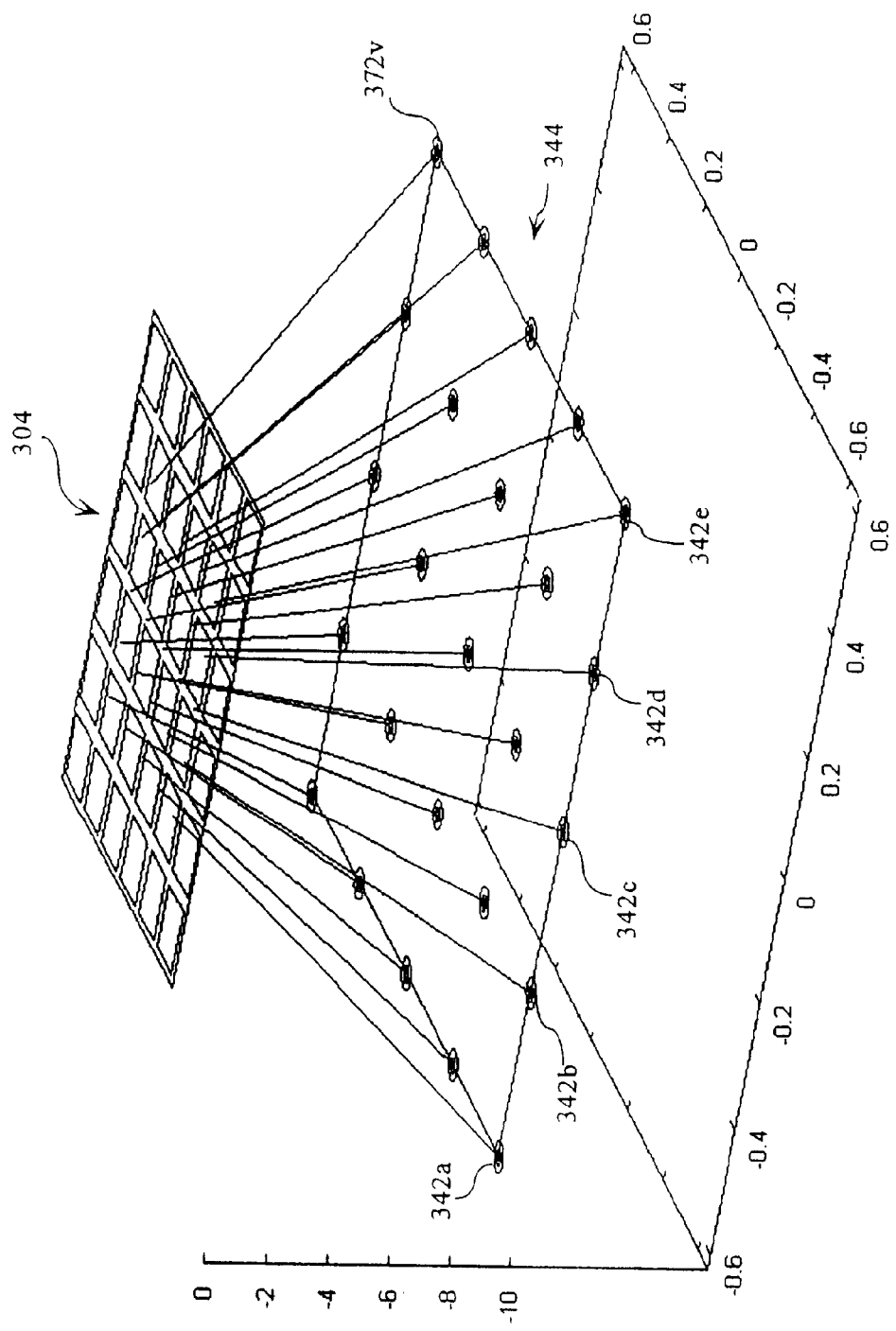
FIG. 3 is a drawing illustrating a method of using an ultrasound imaging system in accordance with the preferred embodiments of the present invention.
Figure 4:
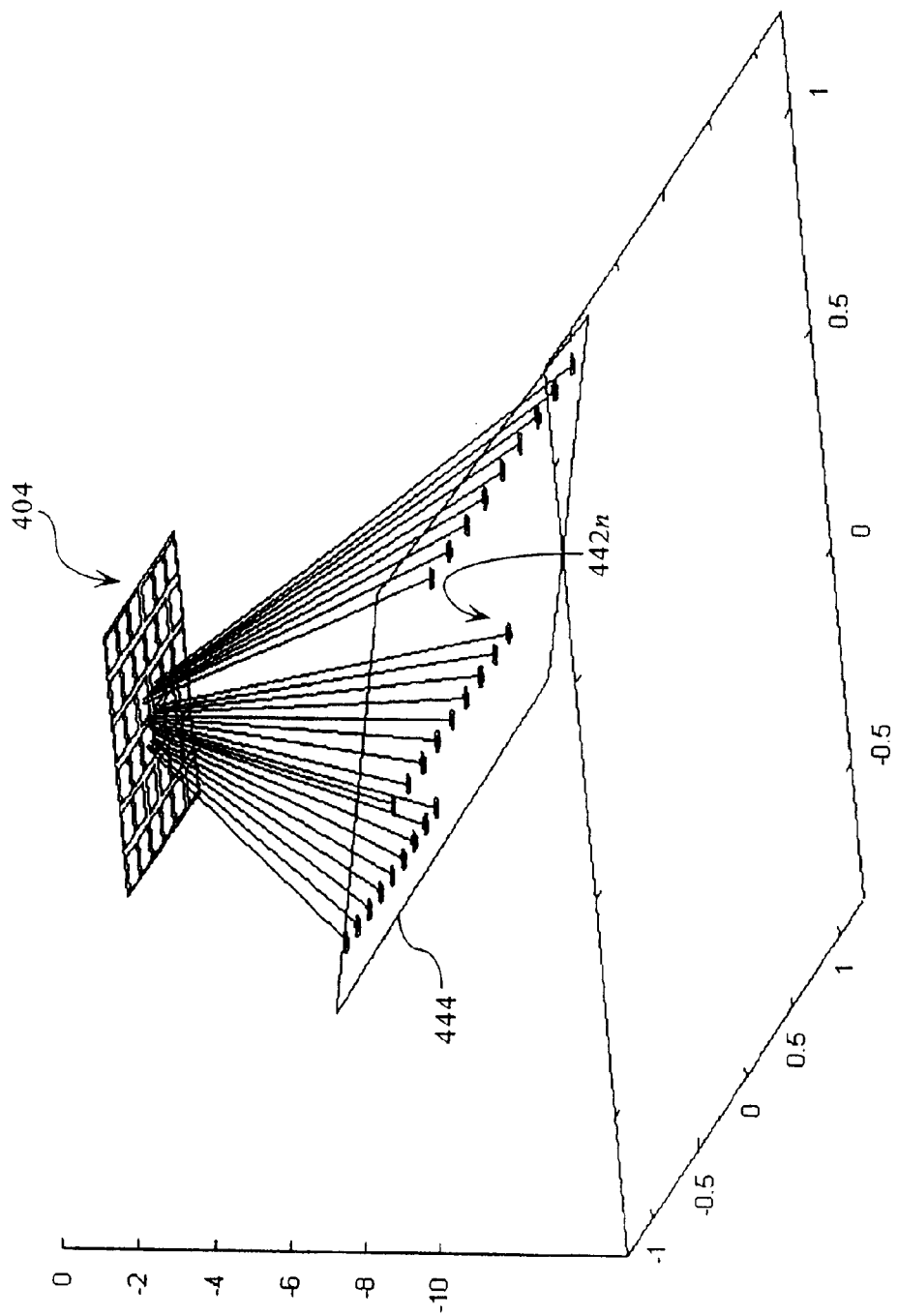
FIG. 4 is a drawing illustrating a method of using an ultrasound imaging system in accordance with the preferred embodiments of the present invention.

The shape and orientation of the imaged plane, shape or slab may be selected based on the structure being imaged. For shallow peripheral vascular scanning a scan plane parallel to the skin may be selected with a shallow focal point. As the depth of the slab is more or less constant, the user may simply sweep over the patient for a view of the subcutaneous layer. Using known techniques, such as image correlation, a sequence of images can be spliced together to provide the user with a large map. As another example, by tilting the slab past 45 degrees, standard cardiac views can be replicated in a transthoracic probe. FIGS. 3 and 4 show further examples of useful scan plan orientations.

FIG. 3 is a drawing illustrating a method of using an ultrasound imaging system in accordance with the preferred embodiments of the present invention. FIG. 3 shows a 6×6 matrix transducer assembly 304 with representative scan lines formed in accordance with the present invention. In particular, FIG. 3 shows scan lines emanating from a virtual scan origin above the face of the transducer assembly 304 and focusing on focus point 342n. The acoustic paths to each element have been eliminated for clarity. In this case a scan plane 344 has been formed roughly parallel to the face of the transducer assembly 304. This configuration facilitates the imaging of structures near the surface of the skin by providing a field of view significantly larger than the physical aperture. As is known to those of ordinary skill in the graphic art, data from multiple frames can be concatenated to form an image having an area greater than the area of an image in any one frame.

Scan lines can also be formed so as to create a virtual apex below the face of the transducer assembly 304. This has been referred to a "keyhole" scanning and is particularly useful for scanning though solid structures, such as ribs, or around other impediments.

FIG. 4 is a drawing illustrating a method of using an ultrasound imaging system in accordance with the preferred embodiments of the present invention. FIG. 4 shows a 6×6 matrix transducer assembly 404 with representative scan lines formed in accordance with the present invention. In particular, FIG. 4 shows scan lines emanating from a virtual scan origin at the face of the transducer assembly 404 and focusing on focus point 442n. A scan plane 444 is formed skewed from the face of the transducer assembly 404. By adjusting the skew of the plane, views comparable to views produced by 1-D transducers can be replicated and even improved. For example, it is possible to produce a "true" short axis view of the left ventricle valves showing an accurate cross-section thereof.

Figure 5:
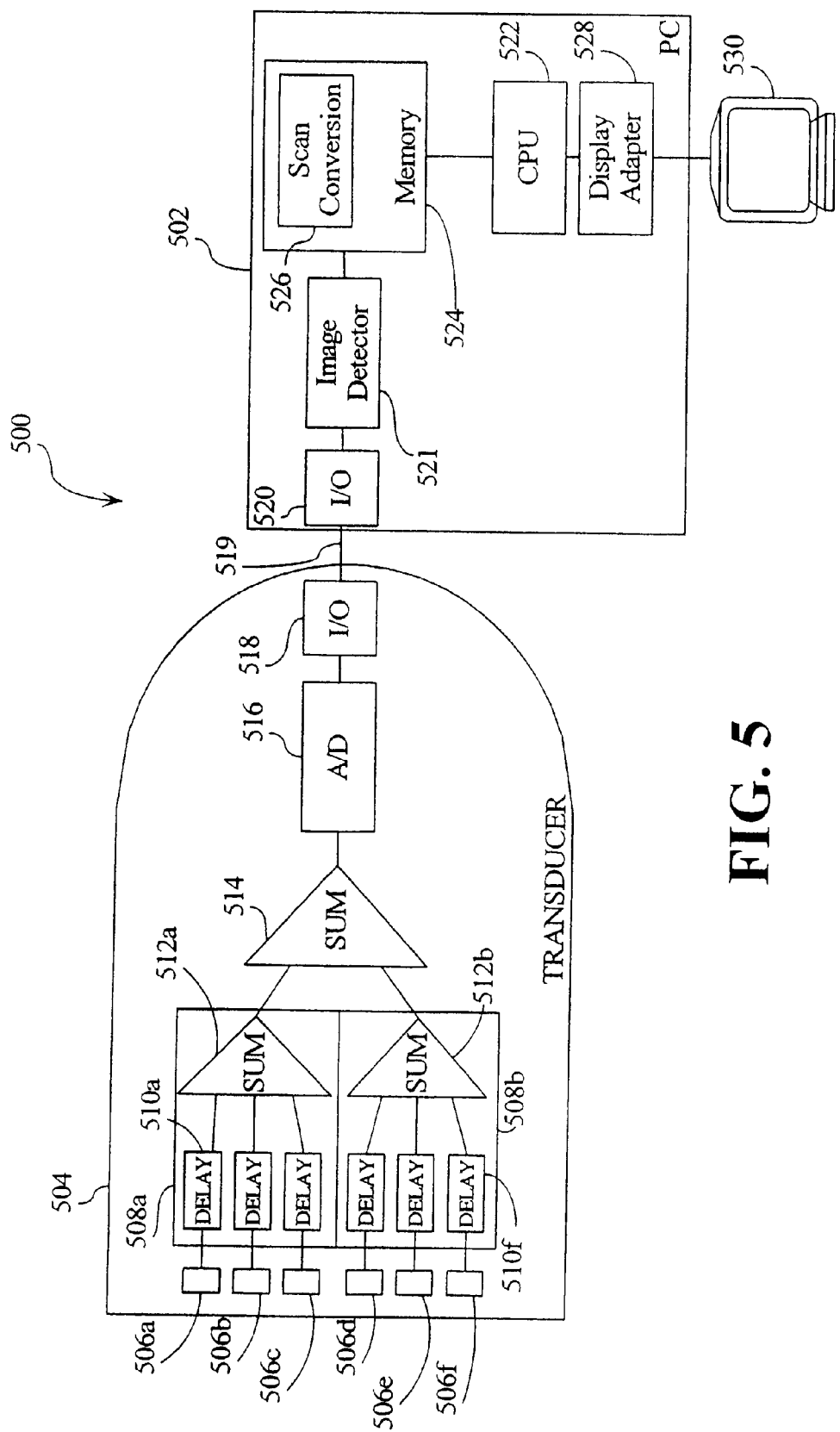
FIG. 5 is a block diagram of an ultrasound imaging system in accordance with a first preferred embodiment of the present invention.
Figure 6:
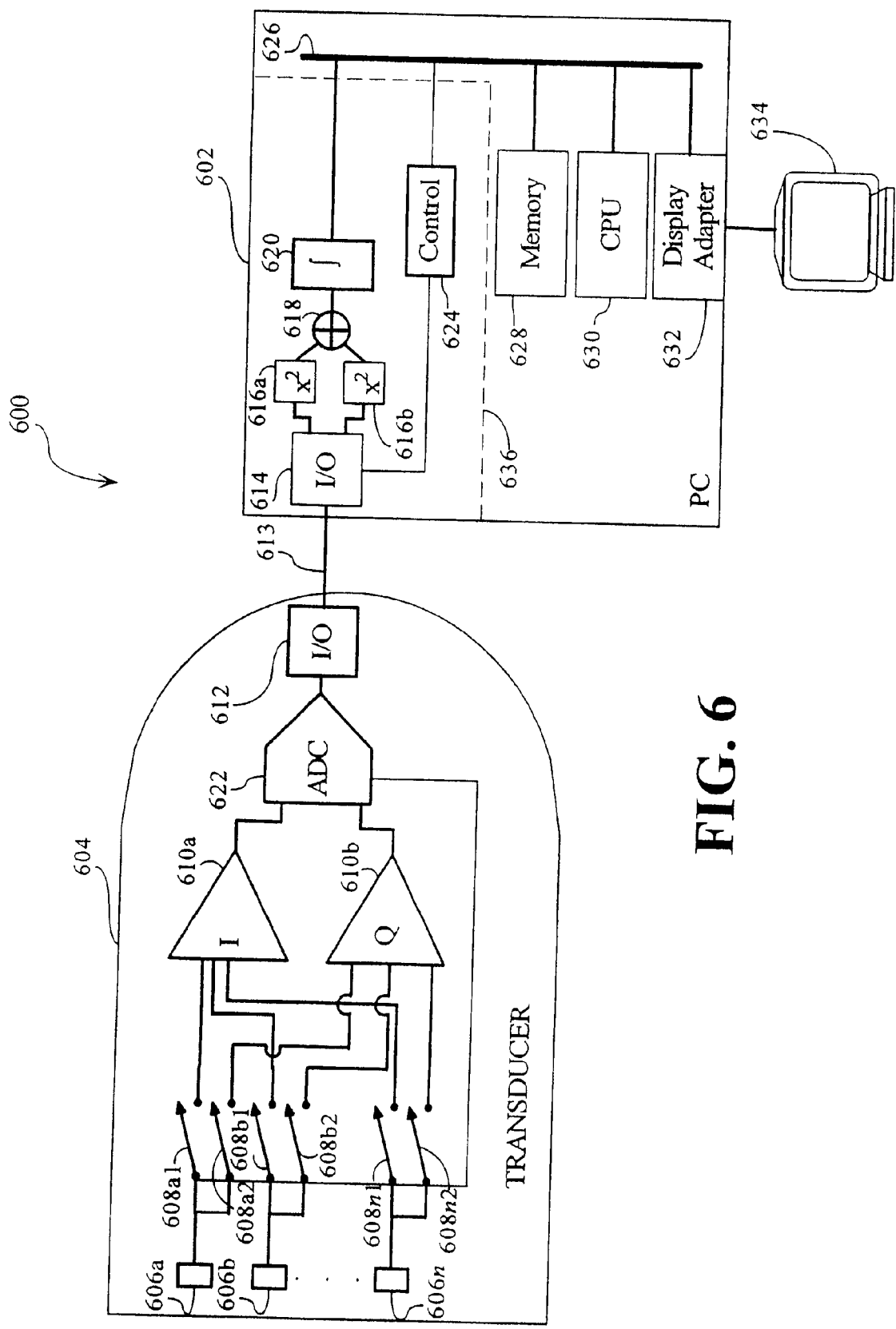
FIG. 6 is a block diagram of an ultrasound imaging system in accordance with a second preferred embodiment of the present invention.

The present invention, as described with respect to FIGS. 2–4 can be implemented on a variety of ultrasound systems. FIGS. 5 and 6 are examples of two architectures optimized for the present invention. However, those of ordinary skill in the art will recognize that the present invention can be practiced on current architectures utilizing traditional dynamic delay beamformers even though the most expensive hardware in such systems would be severely underutilized.

FIG. 5 is a simplified block diagram of an ultrasound imaging system 500 in accordance with the preferred embodiment of the present invention. The ultrasound system 500 is based on existing technology optimized for the present invention. It will be appreciated by those of ordinary skill in the relevant arts that the ultrasound imaging system 500, as illustrated in FIG. 5, and the operation thereof as described hereinafter is intended to be generally representative such systems and that any particular system may differ from that shown in FIG. 5, particularly in the details of construction and operation of such system. FIG. 5 is a simplified diagram that illustrates the inventive features of the present invention. Those of ordinary skill in the art will recognize that certain components have been omitted so as to enhance understanding of the present invention, including for example receive filters. As such, the ultrasound imaging system 500 is to be regarded as illustrative and exemplary and not limiting as regards the invention described herein or the claims attached hereto.

The ultrasound system 500 utilizes a processing unit 502, preferably, but not necessarily, embodied by a standard personal computer ("PC 502"), to act as an image visualization unit. The ultrasound system 500 is provided with a matrix transducer assembly 504. In the Example shown in FIG. 5, only elements 506a through 506f are illustrated, but those of ordinary skill in the art will recognize that any number of elements can be utilized, for example a 48×60 element array is but one option.

The transducer assembly 504 is preferably configured for sub-group beamforming using a series of ASICs 508n. The ASICs 508n are preferably based on the ASICs 108n. Two ASICs 508a and 508b are illustrated, corresponding to elements 506a–f. In the example shown, each ASIC 508n is connected to three (3) elements. Depending on the level of integration, any number of elements, for example 25, 75, 120, 150, etc . . . could be connected to each ASIC 508n. However, in accordance with the preferred embodiment 20 elements are grouped by each ASIC 508n. Each ASIC 508n is provided with a plurality of delay circuits 510n (one for each element connected to the ASIC 508n) that delay the output of a connected element 506n so as to focus and steer acoustic beams.

In accordance with the prior art, the reception delay is static for any given delay circuit 510n with respect to any given beam. Therefore, the delay elements 510n do not need to be capable of dynamic reception focusing. This allows the use of relatively cheap and small circuits for the delay circuits 510n. While such beamforming circuits are known, current conventional wisdom calls for the use of dynamic delay beamforming circuits capable of dynamic reception focusing in almost every application. The present invention dispenses with such complicated circuitry while achieving the benefits provided thereby. It is to be noted, that ultrasound apparatus utilizing convention dynamic delay beamformers can be used in accordance with the methods of the present invention, for example by disabling the dynamic reception focusing. It is noted that dynamic reception focusing need not be "disabled" rather, the system would only sample data from the arbitrary geometry.

While the lack of dynamic reception focusing severely limits the depth of field obtainable with the probe 104, acceptable 2-D images may be obtained using this configuration, and, as discussed herein above, provide some significant advantageous over 2-D images obtained with conventional 1-D probes. The configuration shown in FIG. 5 is particularly suitable for portable ultrasound devices in that it uses a minimal amount of space and a minimal amount of power.

A sum circuit $512n$ combines the output of the delay circuits $510n$ in each ASIC $508n$. A sum circuit $514$ combines the output of each of the sum circuits $512n$ in each of the ASICs $508n$. Preferably, 2880 elements $506n$ are grouped into 144 sub-groups of twenty (20) elements each. Preferably, 128 of the 144 sub-groups are used for imaging, requiring 128 ASICs $508n$, the output of which are summed by the sum circuit $514$.

The output of the sum circuit $514$ is A/D converted by an A/D converter $516$ and sent to the PC $502$ via a communication link comprising I/O controllers $518$ and $520$ along with transmission medium $519$. In accordance with the preferred embodiment, the communication link is a Universal Serial Bus ("USB") link. USB is an industry standard interface for connecting peripherals to a PC and provides up to 2.5W at 5V to the connected peripheral.

The USB 1.1 standard currently in use allows data rate up to 12 Mbits/sec. Utilizing the USB isochronous transfer protocol, periodic bursts of data at 60 Mbits/sec are possible. Such a rate is sufficient for RF capture from an ultrasound probe. In the future USB standard 2.0 will provide a transfer rate of 480 Mbits/sec. Those of ordinary skill in the art will recognize the applicability of other interfaces such as IEEE 1394 (known as "FIREWIRE"). Additionally, depending on the implementation of the present invention, direct connections to a PCI bus or parallel port are feasible. The connection to the PCI bus can be via a PCI card or even a PC card. If data is compressed prior to transfer, other options exist, such as lower speed serial connections.

Each of the I/O controllers $518$ and $520$, can comprise, for example a low-power USB ICs available from CYPRESS SEMICONDUCTOR. Such ICs typically contain enough RAM to store one line of beamformed data and an 8051 based micro-controller for coordinating the isochronous transfer to the PC. An interesting benefit for this design is that the clock for the ASICs $508n$ and the line timing can come from the USB transfer itself: while one transfer is occurring, the clock is providing for the next line's acquisition and storage in RAM.

The output of the sum circuit $514$ is converted to an amplitude "envelope" signal (referred to a "echo data") representing tissue brightness vs. time by an image detector $521$. The envelope signal is subsequently stored in a memory $524$ within the PC $502$ under the direction of a CPU $522$. A scan conversion process $526$ acts on the digital data to produce data for eventual display by a display adapter $528$ on a monitor $530$. The CPU $522$ controls the timing and operation of the transducer $504$ using delay coefficients calculated and/or stored in the memory $524$.

FIG. 6 is a block diagram of an ultrasound imaging system $600$ in accordance with a second preferred embodiment of the present invention. The device shown in FIG. 6 represents a departure from traditional beamformer design and is highly optimized for use with the present invention eschewing all unnecessary hardware. It will be appreciated by those of ordinary skill in the relevant arts that the ultrasound imaging system $600$, as illustrated in FIG. 6, and the operation thereof as described hereinafter is intended to be generally representative such systems and that any particular system may differ from that shown in FIG. 6, particularly in the details of construction and operation of such system. FIG. 6 is a simplified diagram that illustrates the inventive features of the present invention. Those of ordinary skill in the art will recognize that certain components have been omitted so as to enhance understanding of the present invention, including for example receive filters and detectors. As such, the ultrasound imaging system $600$ is to be regarded as illustrative and exemplary and not limiting as regards the invention described herein or the claims attached hereto.

The ultrasound system $600$ utilizes a processing unit $602$, preferably, but not necessarily, embodied by a standard personal computer ("PC $602$"), to act as an image visualization unit. The ultrasound system $600$ is provided with a matrix transducer assembly $604$ having a matrix of elements $606n$. As with the Example shown in FIG. 5, only a couple of elements are illustrated, but those of ordinary skill in the art will recognize that any number of elements can be utilized (for example a 48×60 element array).

The ultrasound system $600$ uses quadrature to facilitate the detection of echo data. This alleviates the need for a dedicated image detector. Each element $606n$ is connected to two switches $608n1$ and $608n2$. If the use of quadrature is not required only a single switch per element would be necessary. The operation of the switches is controlled by a controller to be discussed hereinafter. Basically, each switch acts as a sampler by closing at a specified time to permit a signal from an associated element describing a single locus on an arbitrary geometry to be collected. This locus can be thought of as a focus point, although perfect focus is not necessary. The switches $608$ can be constructed to hold a remotely supplied time value or can be activated by a control signal. Each pair of switches $608n1$ and $608n2$ are closed in sequence, with the switch $608n2$ being timed to close at a time after $608n1$ equivalent to $\frac{1}{4}\lambda$ where $\lambda$ is the period of the fundamental frequency of the ultrasound waveform. Specifically, each of the first switches $608n1$ are programed or controlled to close based on the static focus value for the associated element and each of the second switches $608n2$ are programed to close $\frac{1}{4}\lambda$ after its associated first switch.

To obtain a slab of data the switches $608$ can be configured/controlled so as to open and close a predetermined number of time so as to obtain a burst of samples. In fact, such "burst operation" can be used to obtain samples from the entire depth of the beam.

The outputs of the first switches $608n1$ are summed by a I sum circuit $610a$, while the outputs of the second switches $608n2$ are summed by an Q sum circuit $610b$. The outputs of the I sum circuit $610a$ and the Q sum circuit $610b$ are converted to digital data via an A/D converter $622$ (ADC $622$) and transmitted to the processing unit $602$ via a communication link comprising I/O controllers $612$ and $614$ along with transmission medium $613$. The communication link may, for example, comprise a Universal Serial Bus ("USB") link or an IEEE 1394 link. However, in accordance with the second preferred embodiment, the communication link is implement using a direct connections to a main bus $626$ of the processing unit, and more preferably, is implemented using the PC card standard.

The PC Card standard is set by the Personal Computer Memory Card International Association (PCMCIA) and currently has three implementations designated Type I, Type II, and Type III. Each of the types provides for a 16 bit bus, with each type being progressively thicker (allowing for more circuitry). Additionally, the PCMCIA has issued an extension of the PC Card Standard, referred to as CardBus, that provides a high speed 32-bit bus. The present invention can equally be implemented using a CardBus. Details on implementing the communication like using either the PC Card standard or the CardBus standard are not germane to the present invention, but is suffices to say that those of ordinary skill in the art will be able to effectively implement either solution based on the teachings contained herein.

Once the signals from the I sum circuit 610a and the Q sum circuit 610b are received by the I/O controller 614, they are squared by squaring circuits 616a and 616b and subsequently summed into a single signal by an adder 618. The output of the adder 618 is integrated by integrator 620.

The I/O controller 614, squaring circuits 616a and 616b, adder 618, and integrator 620 are preferably incorporated into a PC Card 636 for interface with the main bus 626 of the PC 602. Further a control circuit 624 is provided on the PC Card 636 to control operation of the various components and to act as an interface with the switches 608. Alternatively, a switch control signal can be provided by the PC 602.

The output of the integrator 620 is provided to a main bus of the PC 602 for subsequent display. The PC 602 is provided with a memory 628, CPU 630 and display adapter 632 as is known in the art. Once the CPU 630 has transformed the data from the matrix transducer assembly 604 into displayable data, a process well known to those of ordinary skill in the art, an image is displayed on the monitor 634 by the display adapter 632.

It will be recognized that an analog communication link can be analog and the squaring circuits 616a and 616b, adder 618, integrator 620 be formed in analog circuitry. An ADC would then be provided to digitize the output of the integrator 620 prior to loading the resultant data into the memory 628.

Although several examples of the present invention have been shown and described, it will be appreciated by those skilled in the art that changes may be made in the described examples without departing from the principles and spirit of the invention, the scope of which is defined in the claims and their equivalents. For example, the ultrasound system 600 can be modified to provide limited dynamic focusing by updating the delay values feed to the switches 608n. Additionally, most conventional imaging modes, such as Doppler and harmonic, can be used in conjunction with the apparatus and methods of the present invention. Further, it is possible to simulate a matrix probe using a mechanical wobbler and either a single element array or a linear array.

What is claimed is:

1. An ultrasound system comprising:
    a transducer assembly having a plurality of elements distributed in two dimensions; and
    a beamformer that, for each beam to be formed for each frame, samples the output of each utilized element so as to generate data within a slab centered about a selected point for each beam, the selected points being located on an arbitrary geometry.
2. The ultrasound system, as set forth in claim 1, wherein the beamformer samples the output of each utilized element so as to generate data for the selected point for each beam.
3. The ultrasound system, as set forth in claim 1, wherein the beamformer generates data for a plurality of points, one point for each beam, on an arbitrary geometry in each frame.
4. The ultrasound system, as set forth in claim 1, further comprising:
    a processor that receives data from the beamformer and produces data suitable for display.
5. The ultrasound system, as set forth in claim 4, further comprising:
    a first housing integrating the transducer assembly and the beamformer; and
    a second housing supporting the processor.
6. The ultrasound system, as set forth in claim 4, wherein the processor is configured to provide delay values to the beamformer.
7. The ultrasound system, as set forth in claim 4, wherein the processor is configured to perform a scan conversion process on the data from the beamformer.
8. The ultrasound system, as set forth in claim 4, wherein the processor is part of a personal computer.
9. The ultrasound system, as set forth in claim 4, further comprising:
    a serial interface connecting the beamformer with the processor.
10. The ultrasound system, as set forth in claim 9, wherein the serial interface is a USB interface.
11. The ultrasound system, as set forth in claim 10, wherein the USB interface conforms with the USB 1.0, 1.1, or 2.0 specifications.
12. The ultrasound system, as set forth in claim 10, wherein the transducer assembly and beamformer are powered via the USB interface.
13. The ultrasound system, as set forth in claim 10, wherein the transducer assembly and beamformer utilize a clock signal provided by the USB interface.
14. The ultrasound system, as set forth in claim 9, wherein the serial interface is an IEEE 1394 based interface.
15. An ultrasound system comprising:
    a transducer assembly having a matrix of elements;
    a beam former that forms a beam using static delay for each element for each focal point in a frame, the focal points for each frame being located on an arbitrary geometry; and
    a processor that receives data from the beamformer and produces data suitable for display.
16. The ultrasound system, as set forth in claim 15, wherein the beam former has a plurality of groups and an overall sum circuit that sums the output of each of the groups, each group comprising a plurality of elements, a delay circuit that delays the output of each element based on a value derived from information from the processor, and a sum circuit that sums the output of each delay circuit in the group.
17. The ultrasound system, as set forth in claim 15, further comprising:
    a first housing integrating the transducer and the beamformer; and
    a second housing supporting the processor.
18. An ultrasound system comprising:
    a transducer assembly having a matrix of elements;
    beamformer means that uses static delay during receive to produce echo data describing a single locus per beam on an arbitrary geometry in a single frame.
19. A method of obtaining ultrasound data comprising:
    isonifying a region using a plurality of elements distributed in at least two dimensions;
    receiving echoes using a static focus on respective focal points, the focal points for each frame being located on an arbitrary geometry; and
    displaying an image based on the received echoes.
20. A method, as set forth in claim 19, further comprising:
    forming a slab of data based on the received echoes; and wherein the step of displaying includes displaying a representation of a portion of the slab of data.

21. A method, as set forth in claim 19, wherein the step of receiving includes:

beamforming signals from the matrix of elements by summing the signals with fixed delays for each element.

22. A method, as set forth in claim 19, further comprising:

transmitting data from a transducer used to isonify the region and receive the echoes to a processing unit via a serial interface.

23. An ultrasound system comprising:

a plurality of elements in a multi dimensional distribution that output a signal representative of a received echo;

a plurality of samplers, at least one sampler being associated with each element, each of the samplers being timed to acquire, for each of a plurality of acoustic events, a signal from an associated element describing a single locus on an arbitrary geometry.

24. An ultrasound system, as set forth in claim 23, wherein each element is connected to at least two samplers.

25. An ultrasound system, as set forth in claim 23, wherein each sampler comprises a switch that responsive to a control signal closes for a predetermined time after a predetermined delay.

26. An ultrasound system, as set forth in claim 23, wherein each sampler comprises a switch that responsive to a control signal sequentially opens and closes a predetermined number of times for a predetermined time after a predetermined delay.

27. An ultrasound system, as set forth in claim 23, further comprising:

a processor that receives data from the plurality of samplers and produces data suitable for display.

28. An ultrasound system, as set forth in claim 27, further comprising:

an adapter card connected to the samplers and the processor that received data from the samplers, processes said data to produce digital data representing the received echos and supplies the digital data to a memory associated with the processor.

29. An ultrasound system, as set forth in claim 27, wherein the adapter card is a PC card.

30. An ultrasound system, as set forth in claim 27, wherein the samplers sample data from an arbitrary geometry using a virtual apex on an opposite side of the plurality of elements as the arbitrary geometry.

31. An ultrasound system, as set forth in claim 27, wherein the samplers sample data from an arbitrary geometry using a virtual apex on a same side of the plurality of elements as the arbitrary geometry.

32. An ultrasound system, as set forth in claim 27, further comprising:

an image processing unit that concatenates data from multiple frames to create a super-set of data describing an area greater than the area described by any one frame.

* * * * *